US012706003B2

(12) United States Patent
Li et al.

(10) Patent No.: US 12,706,003 B2
(45) Date of Patent: Aug. 11, 2026

(54) FLEXIBLE SPINE MODEL AND CORRECTION DEMONSTRATION AND TEST SYSTEM IMPLEMENTED BASED ON SAME

(71) Applicant: SUZHOU SPINEGUIDE TECHNOLOGIES, CO., LTD., Suzhou (CN)

(72) Inventors: Kai Li, Suzhou (CN); Donglei Zhang, Suzhou (CN)

(73) Assignee: SUZHOU SPINEGUIDE TECHNOLOGIES, CO., LTD., Suzhou (CN)

( * ) Notice: Subject to any disclaimer, the term of this patent is extended or adjusted under 35 U.S.C. 154(b) by 739 days.

(21) Appl. No.: 18/288,164

(22) PCT Filed: May 13, 2021

(86) PCT No.: PCT/CN2021/093506
§ 371 (c)(1),
(2) Date: Oct. 24, 2023

(87) PCT Pub. No.: WO2021/228176
PCT Pub. Date: Nov. 18, 2021

(65) Prior Publication Data
US 2024/0242630 A1 Jul. 18, 2024

(30) Foreign Application Priority Data
May 14, 2020 (CN) ......................... 202010409572.0
May 8, 2021 (CN) ......................... 202110500431.4

(51) Int. Cl.
*G09B 23/32* (2006.01)

(52) U.S. Cl.
CPC .................................. *G09B 23/32* (2013.01)

(58) Field of Classification Search
CPC .................................................... G09B 23/32
See application file for complete search history.

(56) References Cited

U.S. PATENT DOCUMENTS

2016/0012753 A1* 1/2016 Mehdian ................ G09B 23/34 434/274
2018/0350268 A1 12/2018 Wu et al.

FOREIGN PATENT DOCUMENTS

CN 101826271 A 9/2010
CN 205411336 U 8/2016
(Continued)

*Primary Examiner* — Kesha Frisby
(74) *Attorney, Agent, or Firm* — SZDC Law PC

(57) ABSTRACT

The present application belongs to the technical field of medical model equipment, and specifically relates to a flexible spine model and a demonstration and test system implemented based on the same. The spine model includes hard structures and a soft elastic connecting material, and the hard structures simulate a layout of spine curvatures and are connected into a whole through the soft connecting material. 1) The present application provides a spine model closer to mechanical characteristics of a human spine and can provide a device for practicing and teaching spine correction treatment for learners. 2) The present application provides a scoliosis correction demonstration model, which can provide a whole visual process of scoliosis correction demonstration for the learners to help improve the learning effect. 3) The present application provides a spine internal fixation system test model which can be used for evaluating properties of different spine internal fixation systems.

19 Claims, 11 Drawing Sheets

(56) References Cited

FOREIGN PATENT DOCUMENTS

| | | | |
|---|---|---|---|
| CN | 107198560 | A | 9/2017 |
| CN | 110253562 | A | 9/2019 |
| CN | 209347345 | U | 9/2019 |
| CN | 110379277 | A | 10/2019 |

* cited by examiner

FLEXIBLE SPINE MODEL AND CORRECTION DEMONSTRATION AND TEST SYSTEM IMPLEMENTED BASED ON SAME

This application is the National Stage Application of PCT/CN2021/093506, filed on May 13, 2021, which claims priority to Chinese Patent Application Nos. CN 202010409572.0, filed on May 14, 2020, and CN 202110500431.4, filed on May 8, 2021, both of which are incorporated by reference for all purposes as if fully set forth herein.

TECHNICAL FIELD

The present application belongs to the technical field of medical model equipment, and specifically relates to a flexible spine model and a demonstration and test system implemented based on the same.

BACKGROUND

A finished spine model is usually made of rubber or plastics. There is no elastic connecting structure between hard skeleton simulants to simulate ligaments around skeletons and other stable structures of a human body. Therefore, changes of a spine under the mechanical actions of instruments cannot be simulated, especially the changes of the spine cannot be simulated when correction force is applied to the spine through an instrument during spine correction surgeries such as a scoliosis correction surgery.

Doctors need a flexible spine model to carry out in-vitro simulation training to master in-vitro correction operations. Meanwhile, mechanical properties and correction effects of different spine fixation systems can be simulated and compared through such a model.

SUMMARY OF THE INVENTION

To solve the aforementioned problems, the present application provides a spine model and a demonstration and test system implemented based on the same.

The present application adopts the following technical solution: a spine model comprises hard structures and a soft elastic connecting material, and the hard structures simulate a layout of spine curvatures and are connected into a whole through the soft connecting material.

Further, the hard structure is in a vertebral body shape or a spine simplified simulation shape.

Further, the hard structure is a blocky structure.

Further, a plurality of through holes are formed in the blocky structure and distributed vertically or horizontally or in a grid form.

Further, the blocky structure is externally provided with bulges, and the bulges may be ring-shaped objects, column-shaped objects, spherical objects or irregularly shaped objects.

Further, the spine model is used for scoliosis correction practices or correction demonstrations or correction system performance testing.

According to a spine growth demonstration model, the soft connecting material between the blocky structures is internally provided with expansion chambers, and expansion materials or expansion structures are arranged in the expansion chambers.

According to a spine growth demonstration model, the blocky structure comprises an upper blocky structure and a lower blocky structure, one is provided with a groove, the other one is provided with a boss matched with the groove, a space between the boss and the groove serves as the expansion chamber, and the expansion material or the expansion structure is arranged in the expansion chamber.

A scoliosis correction demonstration model comprises the spine model, a scoliosis correction system is installed on the spine model, and the hard structures of the spine model are provided with rod-like structures for indicating inclination angles of vertebral bodies.

A scoliosis correction test system comprises a spine model arranged on an correction system, at least one end of the spine model is fixed, and a lateral curvature model is further provided with a torque application mechanism.

Further, the spine model is arranged horizontally, two ends of the spine model are fixedly connected to a fixed frame respectively, and a middle part of the spine model is connected to the torque application mechanism.

Further, the spine model is arranged horizontally, one end of the spine model is fixedly connected to the fixed frame, the other end of the spine model is rotationally connected to the fixed frame, and the torque application mechanism is connected to the spine model close to the rotational connecting end.

Further, the spine model is arranged vertically, the bottom end of the spine model is fixed, and the top end of the spine model is connected to the torque application mechanism.

Further, the magnitude of force applied by the torque application mechanism is adjustable.

A spine model correction performance test model comprises a spine model and further comprises force application mechanisms connected to one end of the spine model.

A spine model correction performance test system comprises a spine model, and further comprises a compression unit connected to one end of the spine model and a dynamometer connected to the other end of the spine model.

Compared with the prior art, the present application has the following beneficial effects:

a. The present application provides a spine model closer to mechanical characteristics of a human spine and can provide a device for practicing and teaching spine correction treatment for learners.
b. The present application provides a scoliosis correction demonstration model, which can provide a whole visual process of scoliosis correction demonstration for the learners to help improve the learning effect.
c. The present application provides a spine internal fixation system test model which can be used for evaluating properties of different spine internal fixation systems.

DESCRIPTION OF THE DRAWINGS

In FIG. 1—soft connecting material, 2—hard structure, 2.1—upper blocky structure, 2.2—lower blocky structure, 3—first through hole, 4—second through hole, 5—vertical plate, 6—butterfly nut, 7—round bead, 8—*rod*—like structure, 9—rail, 10—sliding table, 11—compression unit, 12—dynamometer, 13—fixed block, 14—test bed, 15—round hole, 16—sliding block, 17—bolt hole I, 18—bolt hole, 19—bolt hole II, 20—base, 21—vertical rod, 22—counter weight, 23—first rod piece, 24—second rod piece, 25—expansion chamber, 26—bulge.

DESCRIPTION OF EMBODIMENTS

Figure 1:
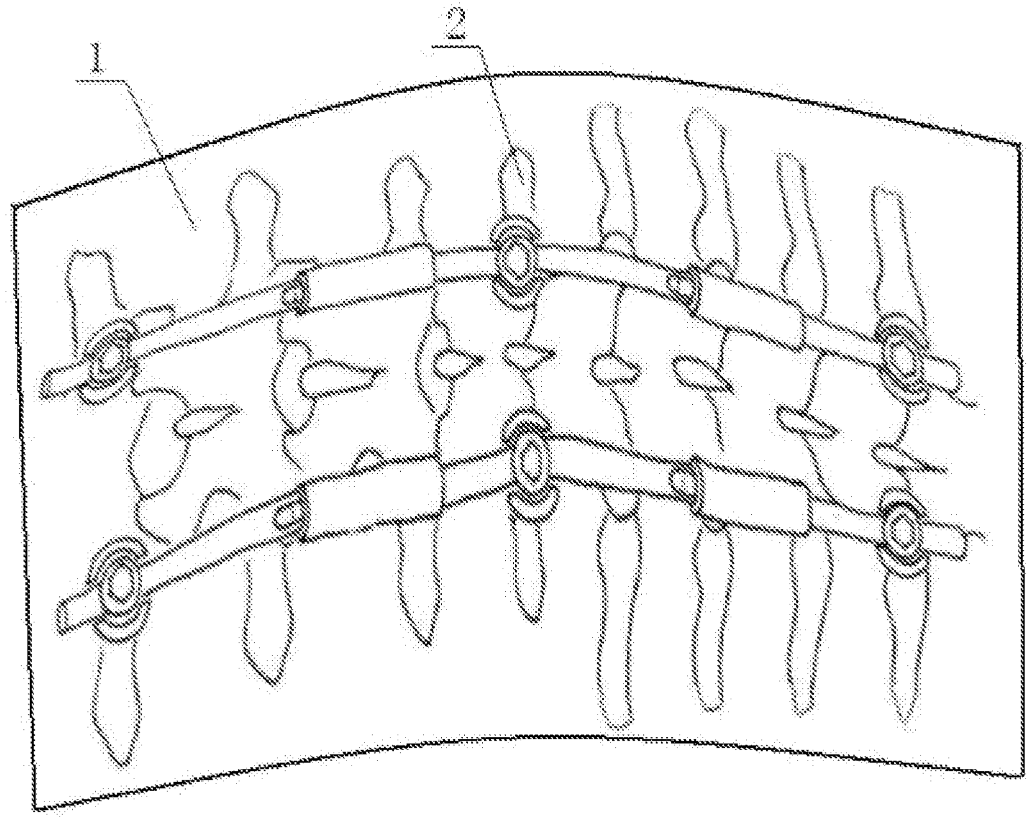
FIG. 1 is a structural schematic diagram of a static scoliosis model.

Example 1: As shown in FIG. 1, a spine model includes hard structures 2 and a soft elastic connecting material 1, and the hard structures 2 simulate a layout of spine curvatures, i.e., the hard structures 2 simulate a structure of a spine. The hard structures 2 are connected into a whole through the soft connecting material 1. The soft elastic material refers to an elastic material (such as rubber and silica gel) that may be deformed greatly under stress and may return to its approximately initial shape and size promptly after external force is removed.

Figure 2:
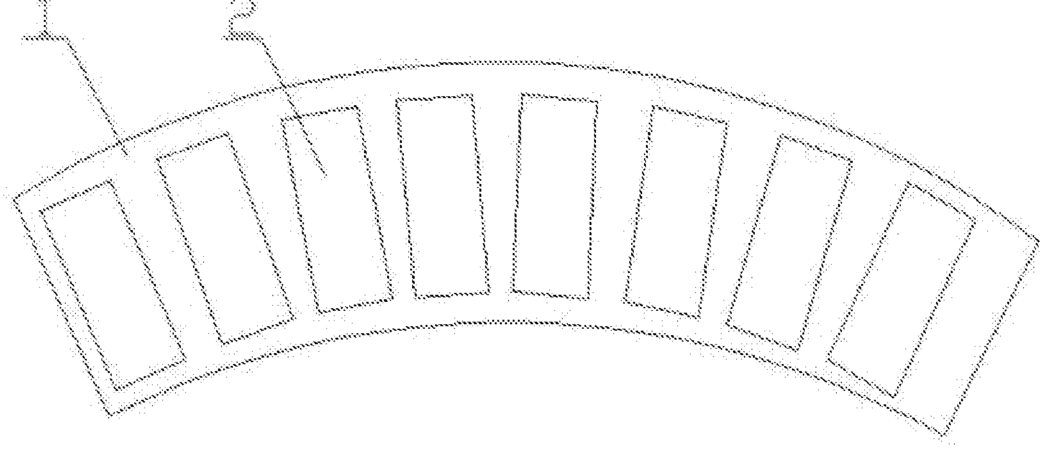
FIG. 2 is a structural schematic diagram of another static scoliosis model.

Example 2: as shown in FIG. 2, a spine model includes hard structures 2 and a soft elastic connecting material 1, the hard structure 2 is a blocky structure that is a hard material of which the hardness allows a screw to be screwed in and the strength can maintain a position of the screw and its form, such as a high-polymer material (like polyethylene PE, polyvinyl chloride PVC, nylon, etc.), wood and so on. The blocky structures are used for simulating a single spine structure. The hard structures 2 are connected into a whole through the soft connecting material 1. The soft elastic connecting material 1 may be a polyurethane material, a silica gel material or a rubber material.

Figure 6:
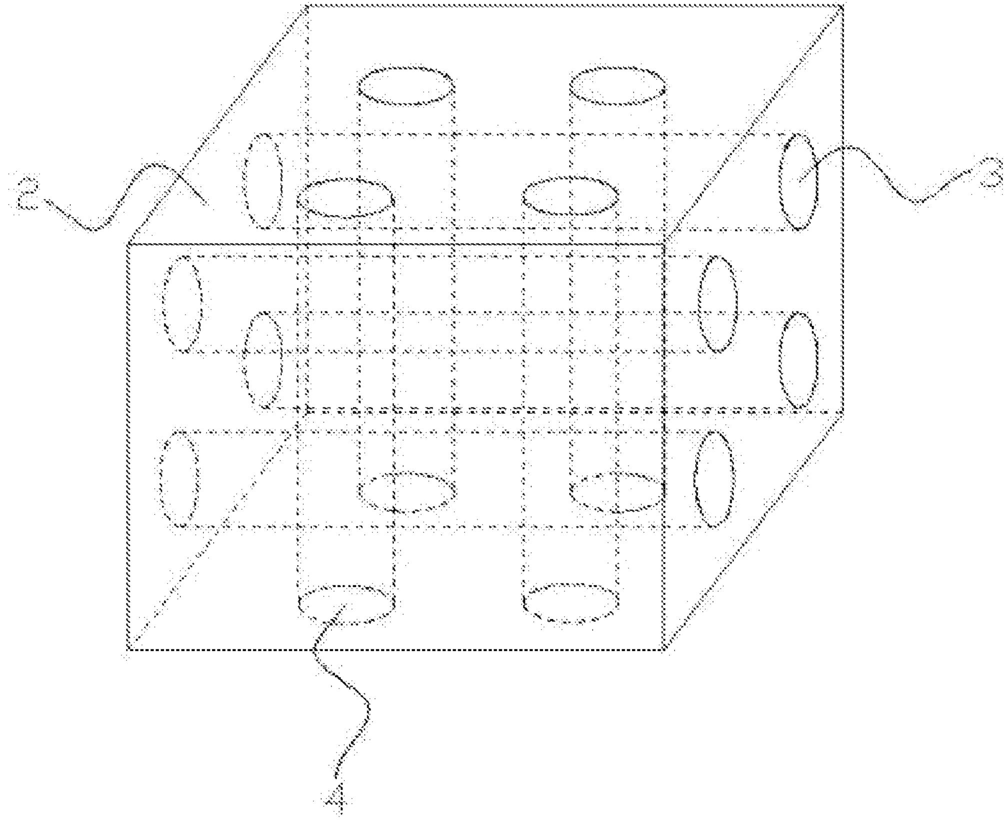
FIG. 6 is a structural schematic diagram of a hard structure.

A plurality of through holes are distributed in the blocky structure in the vertical direction and horizontal direction. The plurality of through holes can form a grid shape. As shown in FIG. 6, first through holes 3 in the horizontal direction and second through holes 4 in the vertical direction are in communication with each other. Or first through holes 3 in the horizontal direction and second through holes 4 in the vertical direction pass through the blocky structure and are not in communication with each other. When combined with the hard structures 2, the soft connecting material 1 runs through the first through holes 3 and the second through holes 4 and forms an integral structure with the hard structures 2.

Figure 7:
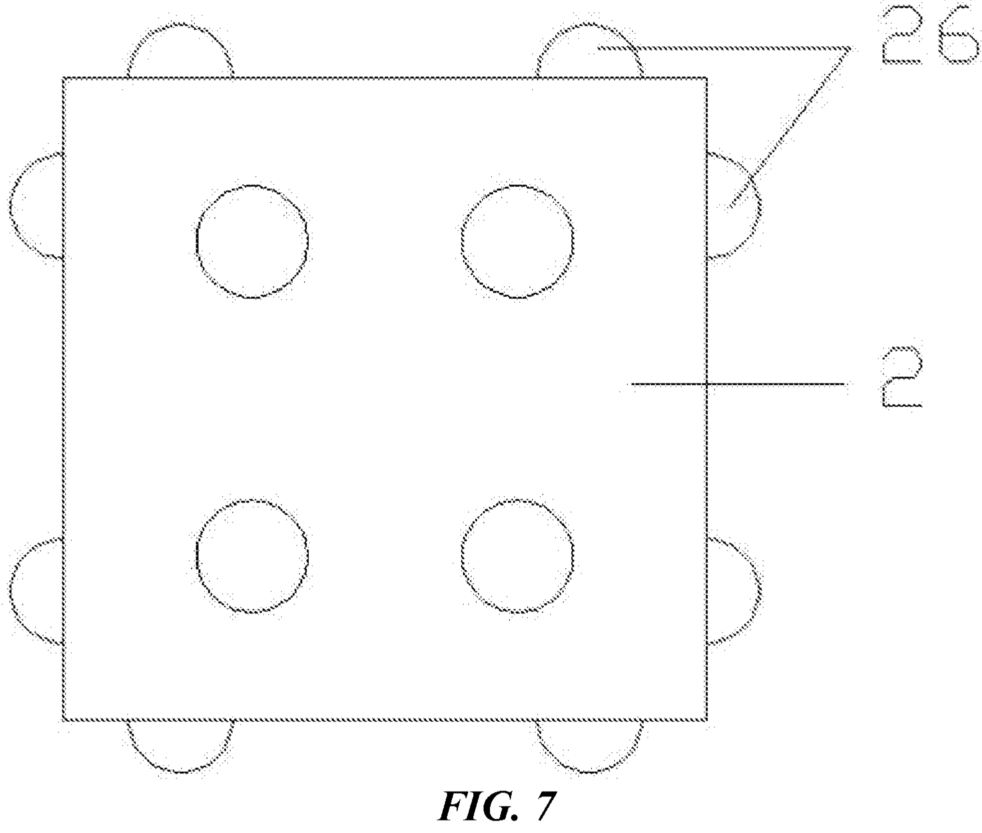
FIG. 7 is a structural schematic diagram of another hard structure.

As shown in FIG. 7, the blocky structure is externally provided with bulges 26, and the bulges 26 may be ring-shaped objects, column-shaped objects, spherical objects or irregularly shaped objects to facilitate attachment of the soft elastic connecting material 1.

The spine model can be used for scoliosis correction practices or correction demonstrations or correction system performance testing.

Figure 3:
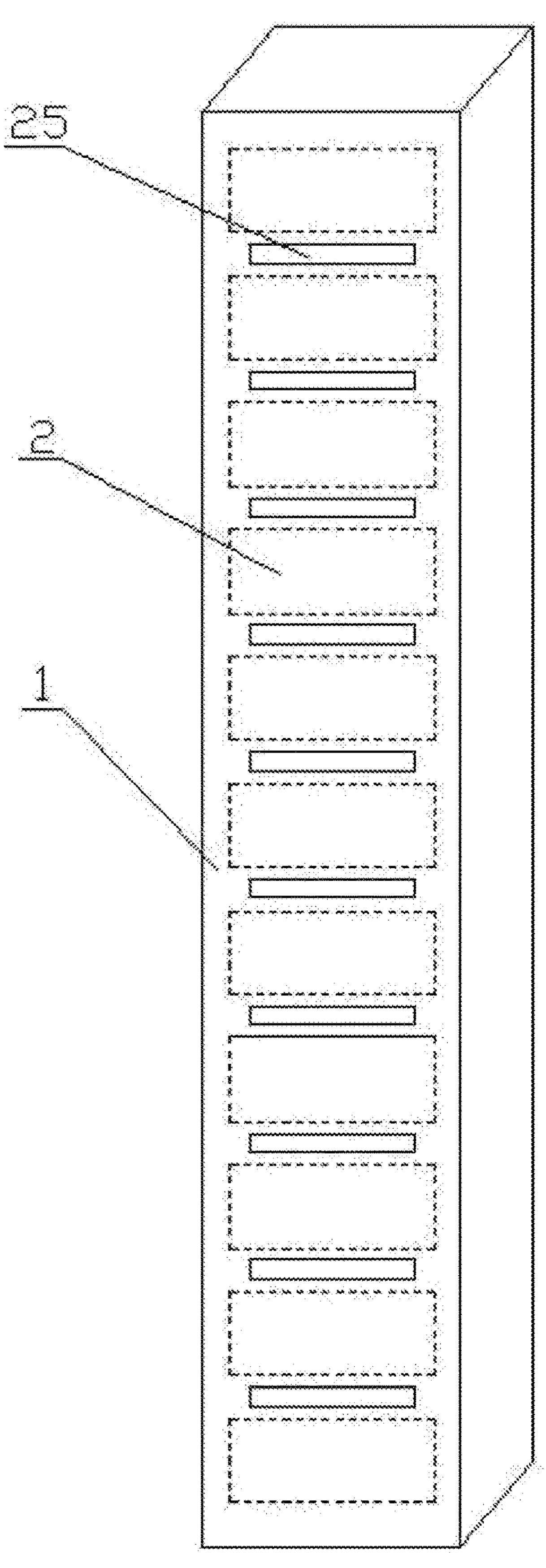
FIG. 3 is a structural schematic diagram of a dynamic scoliosis model.

Example 3: FIG. 3 shows a spine growth demonstration model, a lateral curvature spine model is provided with a plurality of expansion chambers 25, and the expansion chambers 25 are formed in the soft elastic connecting material 1 and located between every two adjacent hard structures. Expansion materials or expansion structures are placed in the expansion chambers 25. During the expansion process of the expansion materials, the lateral curvature spine model simulates the growth of a spine. The expansion chamber 25 in this example may be a rectangular structure or a circular structure and the like. The number of the expansion chambers may be one or more. The expansion chambers need to be evenly arranged between every two hard structures to ensure that expansion force acts on upper and lower contact surfaces evenly.

Figure 4:
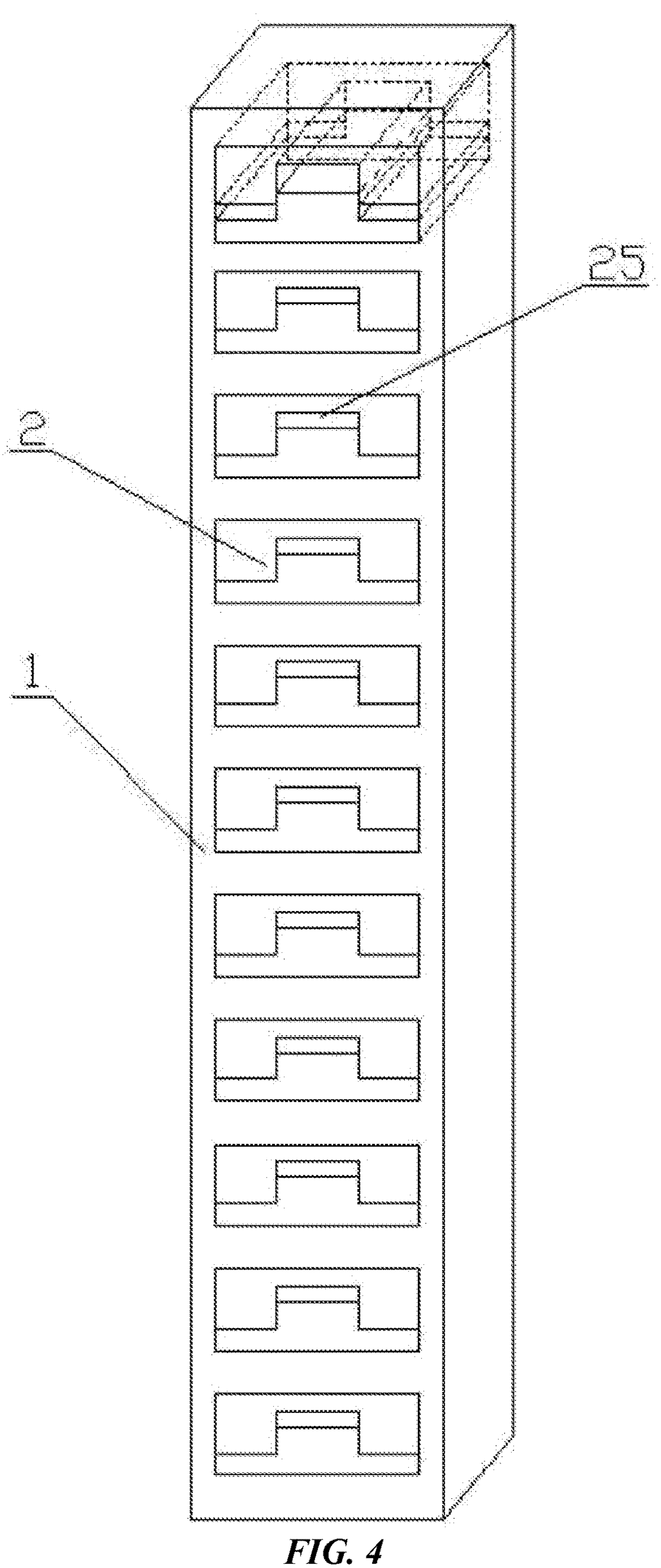
FIG. 4 is a structural schematic diagram of another dynamic scoliosis model.
Figure 5:
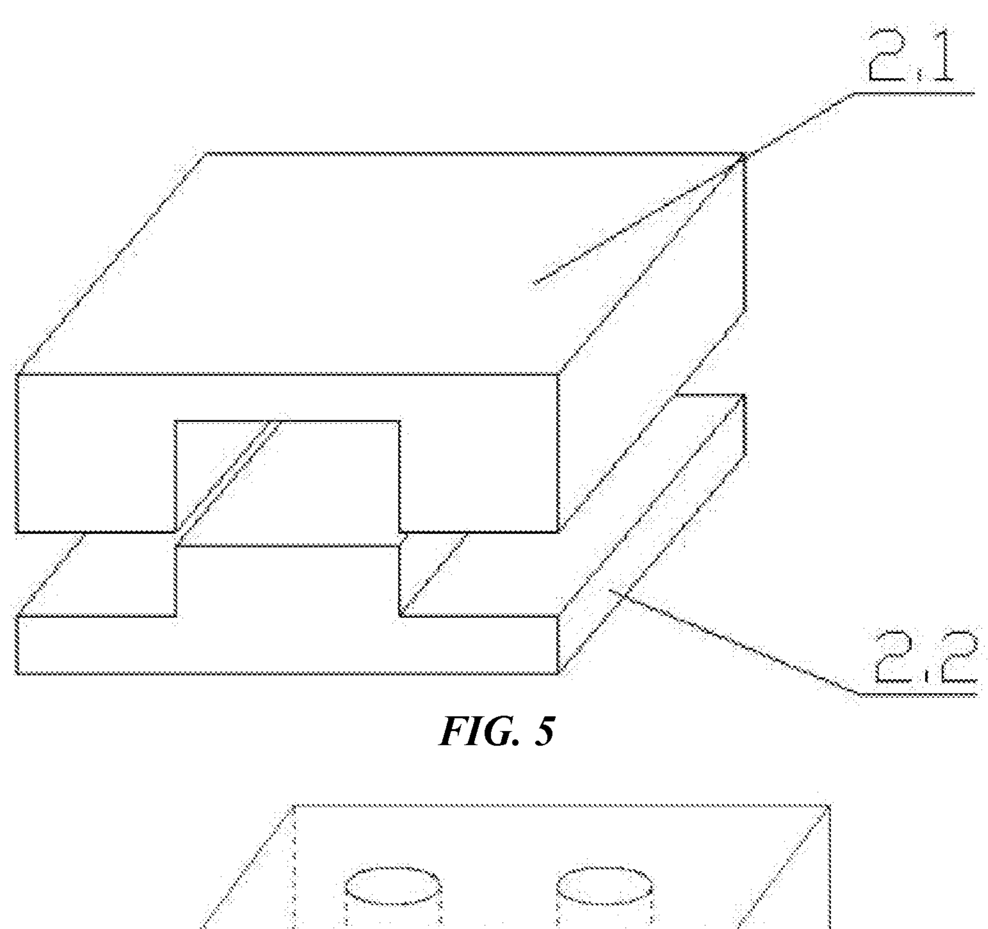
FIG. 5 is a structural schematic diagram of a hard structure in another dynamic scoliosis model.

Example 4: FIG. 4 and FIG. 5 show a spine growth demonstration model. The blocky structure includes upper and lower blocks (an upper blocky structure 2.1 and a lower blocky structure 2.2), wherein the upper blocky structure 2.1 is provided with a groove, the lower blocky structure 2.2 is provided with a boss matched with the groove, a space between the boss and the groove serves as the expansion chamber 25, and an expansion material or an expansion structure is arranged in the expansion chamber 25. The blocky structures can extend under the action of the expansion materials. According to this solution, the blocky structure is made into two halves equivalently, the two halves can move relatively, and the expansion material is placed between the two halves.

The expansion materials in Example 3 and Example 4 may be a water-absorption expansion resin, an expanding agent, a compressed fiber braided fabric or the like. The expansion materials are formed in blocks and can expand evenly in volume within a few minutes when exposed to water. The situation that expansion force in other directions is reduced obviously because the expansion materials are deformed and squeezed out from unlimited directions because of being limited in some directions cannot occur. The expansion structure may be an inflatable or water-filling plastic capsule structure, or expansion is simulated by using a mechanical structure, for example, using a miniature device having the same structure as a jack.

Figure 9:
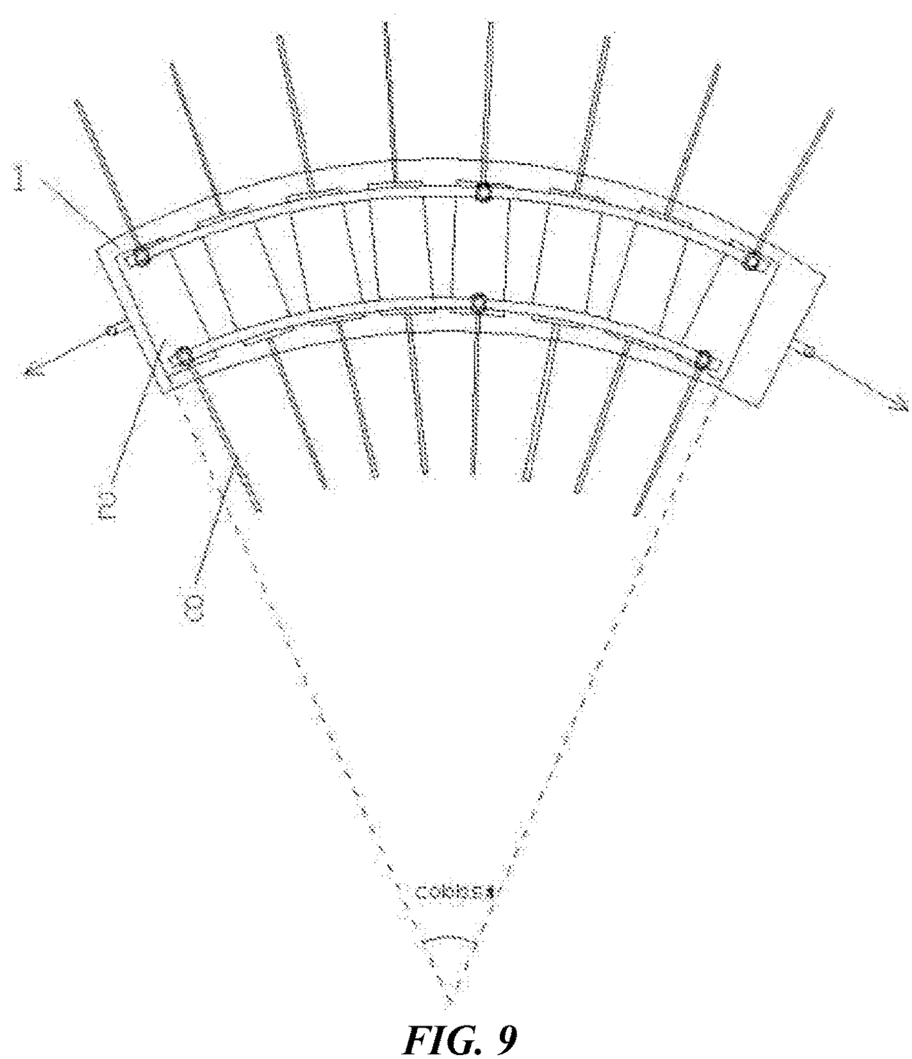
FIG. 9 is a schematic diagram of a scoliosis correction demonstration system with an additional inclination indicating lever.

Example 5: FIG. 9 shows a scoliosis correction demonstration model, a scoliosis correction system is installed on the spine model, and the hard structures of the spine model are provided with rod-like structures for indicating inclination angles of vertebral bodies. The rod-like structures 8 for indicating the inclination angles of the vertebral bodies extend outwards from two sides of the hard structures 2. As bending angles of the hard structures 2 change, included angles between the rod-like structures 8 are different. The bending angles are observed visually according to the included angles between the rod-like structures 8.

Figure 8:
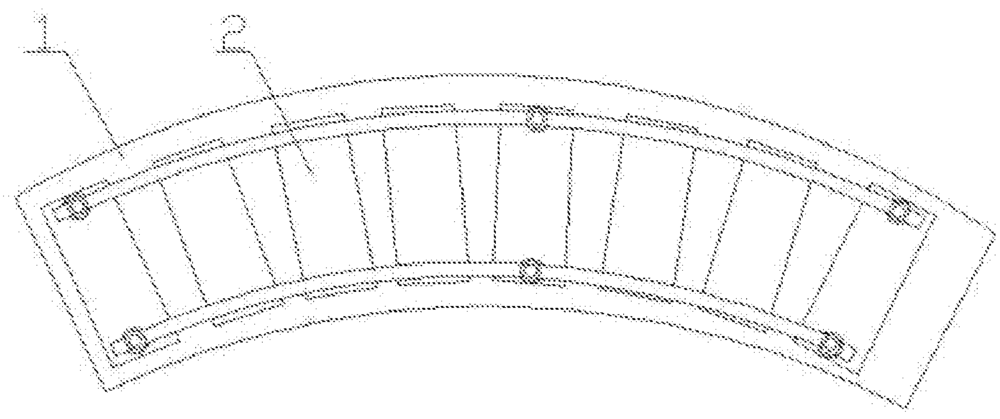
FIG. 8 is a schematic diagram of a scoliosis correction demonstration system.

Example 6: a lateral curvature spine model can be used for scoliosis correction teaching practices. As shown in FIG. 8, a scoliosis correction teaching practice model includes a spine model, and a scoliosis correction system is arranged on the spine model. Firstly, a scoliosis model is adjusted to a bending state to simulate a sick spine; and secondly, a scoliosis correction system for testing is fixed to the scoliosis model and demonstrates an correction process of the scoliosis correction system on the scoliosis model for viewing by students.

Example 7: A scoliosis correction test system includes a spine model arranged on an correction system, at least one end of the spine model is fixed, and a lateral curvature model is further provided with a torque application mechanism.

Figure 10:
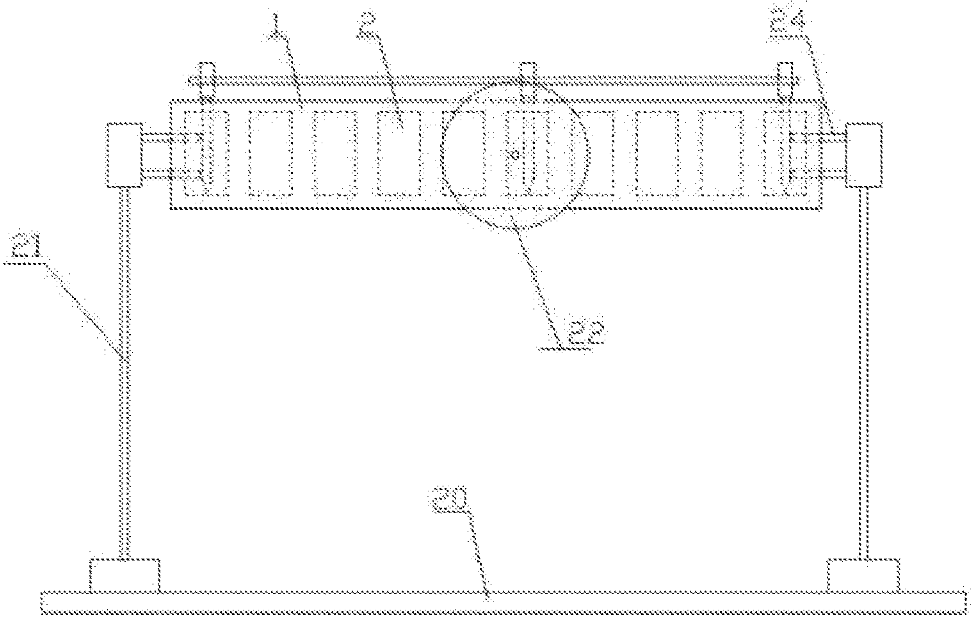
FIG. 10 is a schematic diagram of a test structure of a scoliosis correction test system.

As shown in FIG. 10, the spine model is arranged horizontally, two ends of the spine model are fixedly connected to a fixed frame respectively, and a middle part of the spine model is connected to the torque application mechanism.

Figure 11:
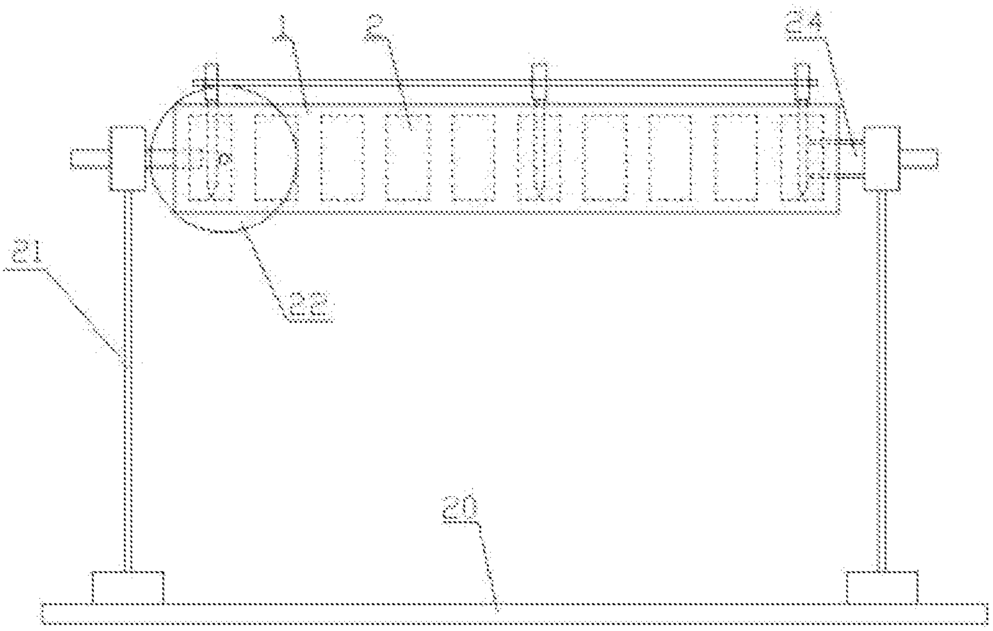
FIG. 11 is a schematic diagram of a test structure of another scoliosis correction test system.

As shown in FIG. 11, a spine model is arranged horizontally, one end of the spine model is fixedly connected to a fixed frame, the other end of the spine model is rotationally connected to the fixed frame, and a torque application mechanism is connected to the spine model close to the rotational connecting end.

Demonstration of torsion of a coronal plane of a spine: at first, as shown in FIG. 10, two ends of a scoliosis model are fixed to second rod pieces 24, the second rod pieces 24 may be a plurality of metal bars and are used for fixing the spine model and a fixed frame. Alternatively, as shown in FIG. 11, one end of the scoliosis model is fixed to the second rod pieces 24, two ends of the scoliosis model are fixed to the second rod pieces 24, and the other end of the scoliosis model is connected and fixed to a rotating shaft.

Figure 12:
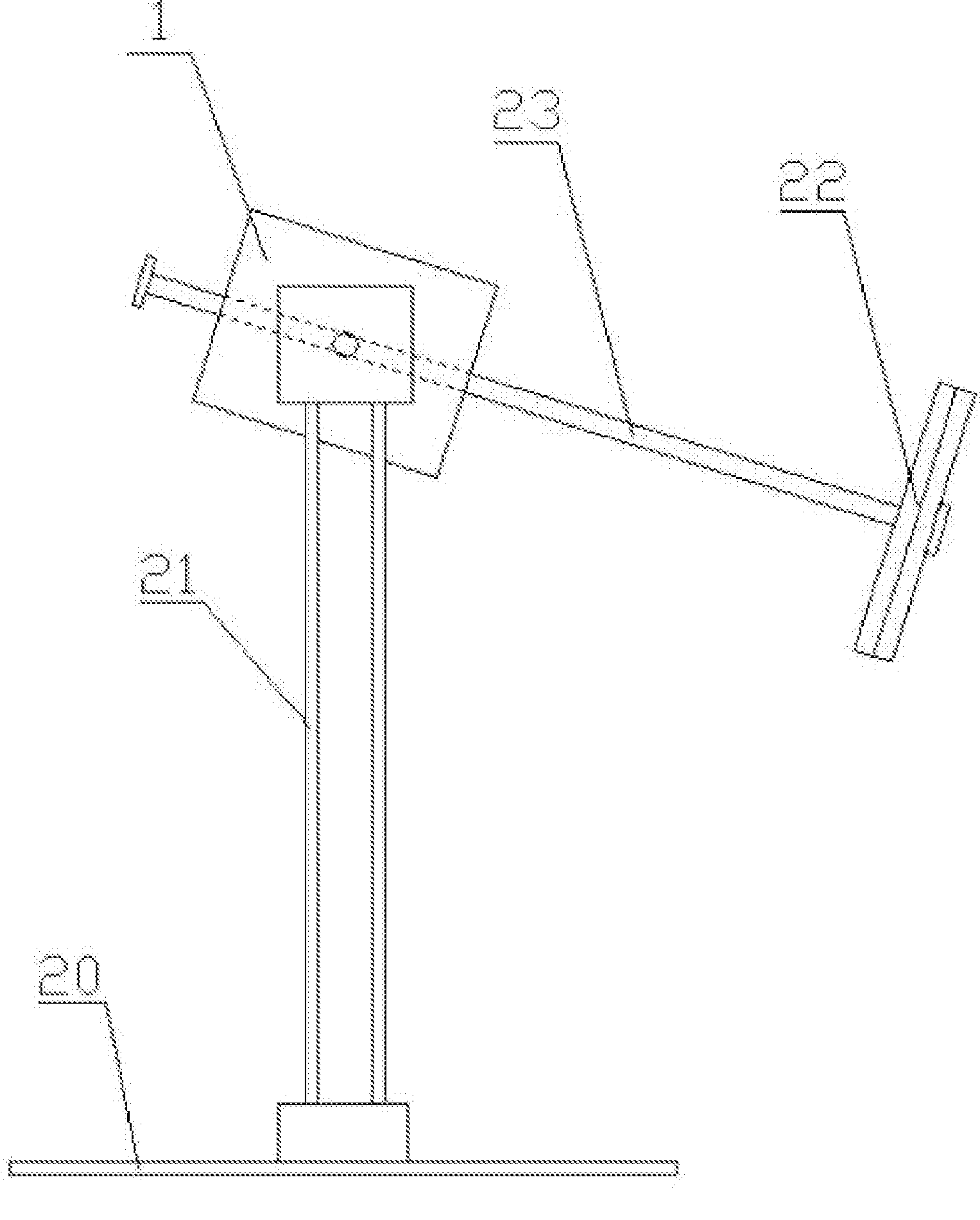
FIG. 12 is a side view of FIG. 11.

The fixed frame includes blocky fixed structures at two ends which are used for being connected to the rotating shaft or the second rod pieces 24. The blocky fixed structures can be made of wood blocks or other materials. The blocky fixed structures with insertion holes are used for fixing the rod pieces 24. The blocky fixed structures are fixed to a base 20 through vertical rods 21. To ensure stability, a plurality of groups of vertical rods 21 can be arranged. The torque application mechanism includes a drill hole formed in a side surface of the scoliosis model, and a first rod piece 23 is arranged in the drill hole. The first rod piece 23 penetrates through the drill hole. A counter weight 22 is arranged at one end of the first rod piece 23, and a stop block with a diameter greater than that of the hole is arranged at the other end, and the stop block is used for stopping the first rod piece 23 from sliding out from the hole. As shown in FIG. 12, when the counter weight 22 is inclined on one side of the scoliosis model, the scoliosis model is twisted to simulate torsion of the coronal plane of the spine. The adjustable function of the magnitude of force applied by the torque application mechanism is completed by adjusting the weight and torque of the counter weight 22.

Figure 13:
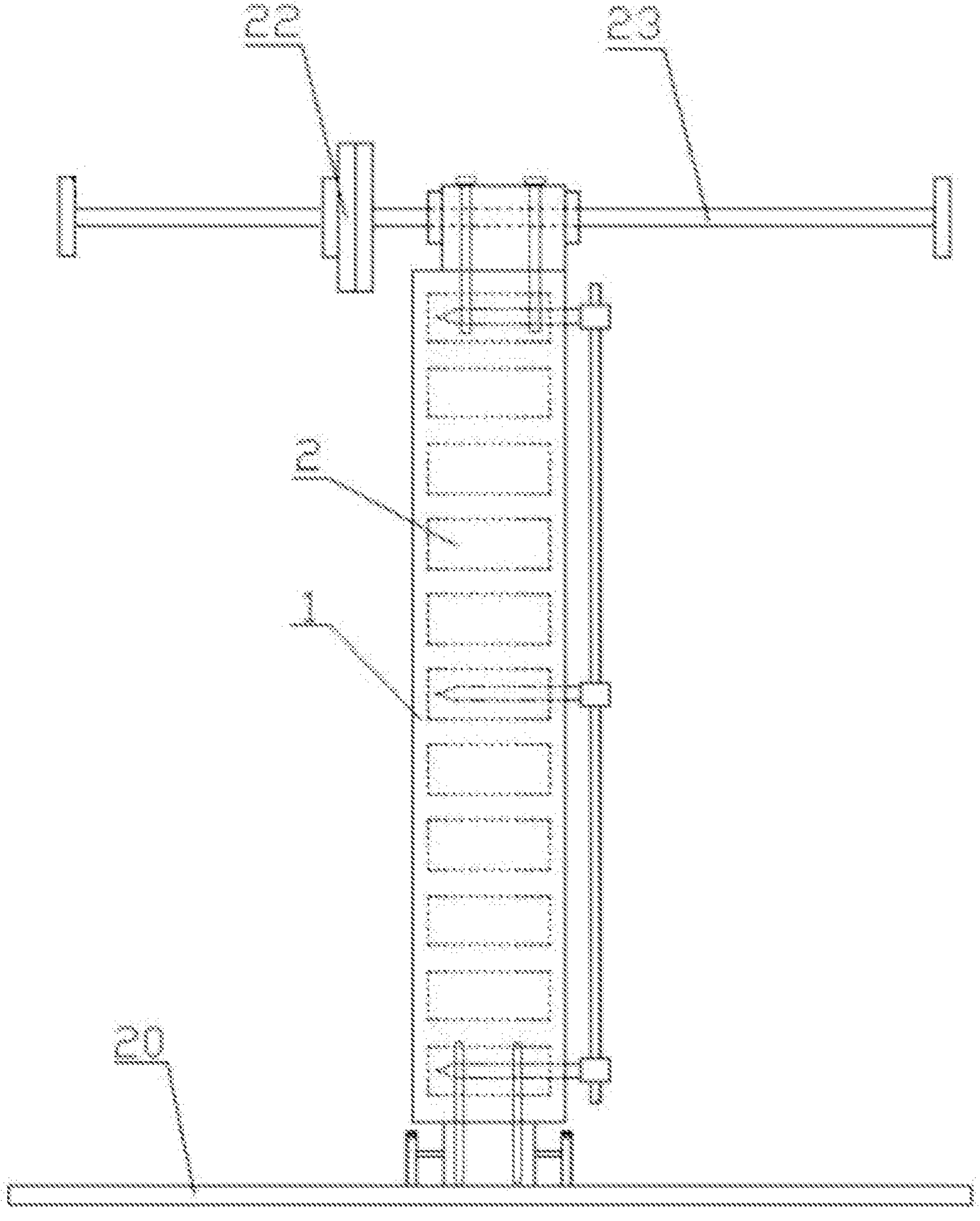
FIG. 13 is a schematic diagram of a test structure of yet another scoliosis correction test system.

Example 8: As shown in FIG. 13, a spine model is arranged vertically, the bottom end of the spine model is fixed, and the top end of the spine model is connected to a torque application mechanism.

Figures 14, 15:
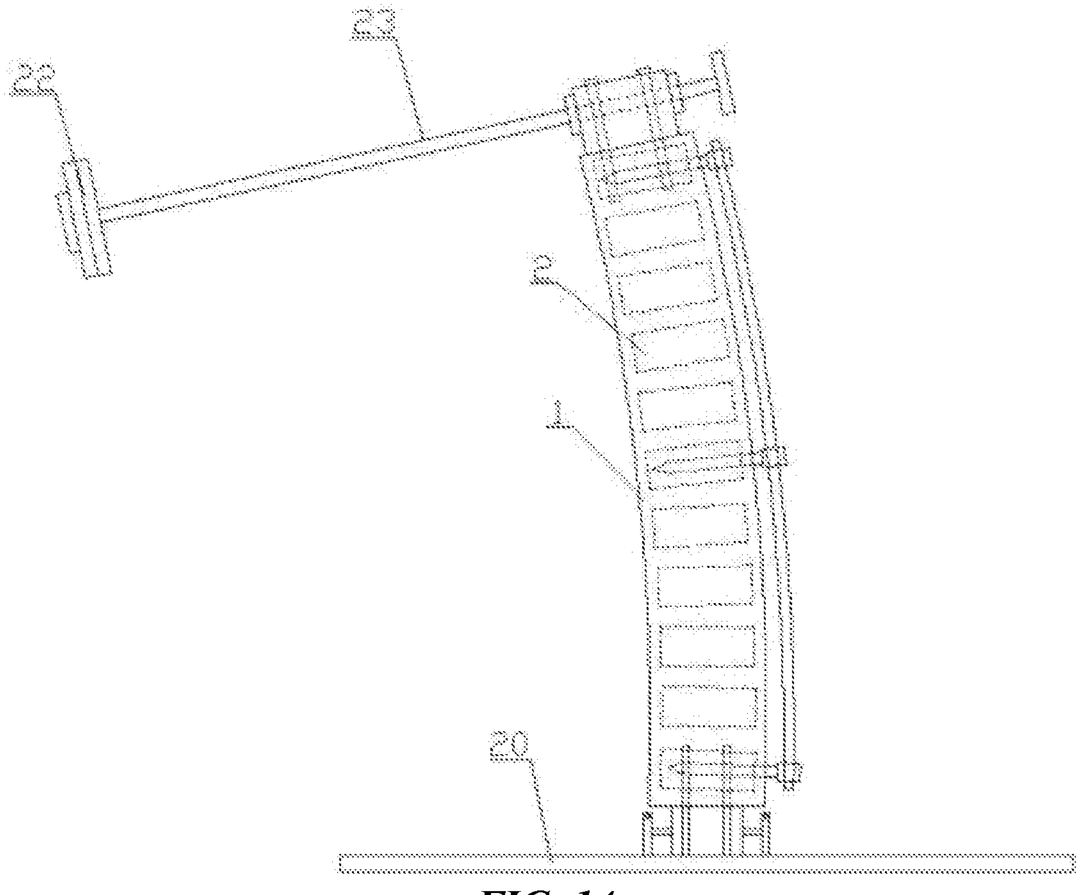
FIG. 14 is a schematic diagram of the structure in FIG. 13 after being stressed.
FIG. 15 is a top view of a spine model correction performance test model.

Bending demonstration of a sagittal plane of a spine: a lower end of a scoliosis model is fixed to a base 20, a hole is drilled from front to back at an upper end of the scoliosis model, a first rod piece 23 penetrates through the hole, a counter weight 22 is arranged at one end, a stop block with a diameter greater than that of the hole is arranged at the other end, and the stop block is used for stopping the first rod piece 23 from sliding out from the hole. As shown in FIG. 14, the counter weight 22 is arranged at an outer end of the first rod piece 23 to apply a bending force to the scoliosis model to simulate and demonstrate bending of the sagittal plane of the spine.

Figure 16:
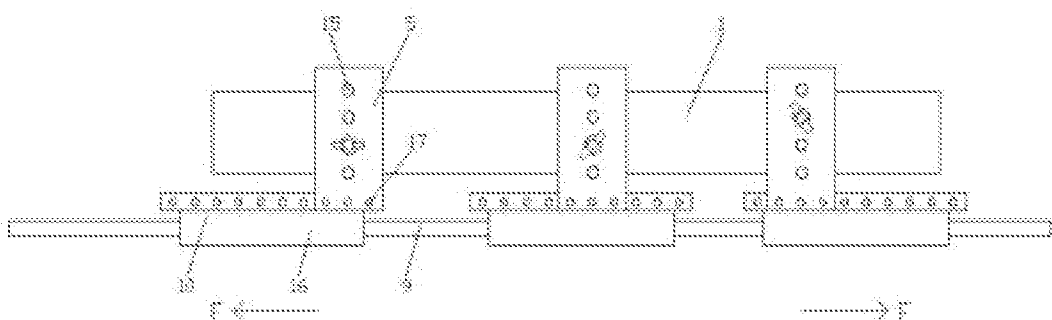
FIG. 16 is a side view of the spine model correction performance test model.

Example 9: as shown in FIG. 15 and FIG. 16, a spine model correction performance test model includes a spine model and further includes force application mechanisms connected to one end of the spine model.

Specific testing of the spine model correction performance test model can be carried out on a test bed 14, or the force application mechanisms can be directly installed at two ends of the spine model. We carry out testing on the test bed 14 for example. Two rows of rails 9 are arranged on the test bed 14, and two ends of the rails 9 are fixed through fixed blocks 13. Sliding blocks 16 capable of sliding along the rails are arranged on the rails 9, and sliding tables 10 are installed on the sliding blocks 16. A plurality of groups of sliding blocks 16 and sliding tables 10 are arranged on the rails 9. The spine model on which a scoliosis correction system is installed is fixed to the sliding tables 10. Each sliding table 10 is provided with two rows of bolt holes 18. The spine model can be fixed to the sliding tables 10 through bolts. A specific location of the spine model is adjusted. Two sides of the sliding table 10 are respectively provided with a row of bolt holes II 19. The sliding tables are fixed to vertical plates 5 through the bolt holes II 19. Bottoms of the vertical plates 5 are provided with bolt holes I 17 corresponding to the bolt holes II 19. Front and back positions of the vertical plates 5 can be adjusted by adjusting relative positions of the bolt holes I 17 and the bolt holes II 19. The vertical plate 5 is provided with a row of round holes 15 in the vertical direction. Rod-like structures 8 on two sides of the spine model penetrate through the round holes 15. Two ends of the rod-like structures 8 pass through round beads 7 and are tightened through butterfly nuts 6 on outer sides of the round beads 7. Under the cooperation of the round beads 7 and the butterfly nuts 6, the rod-like structures 8 are fixed in the round holes 15 and cannot move. The force application mechanisms may be machines such as hydraulic oil cylinders or air cylinders. As shown in FIG. 15 and FIG. 16, the force application mechanisms are arranged on an outer side of one end of the spine model, and the spine model cannot move by fixing the sliding blocks 16 for fixing the spine model at the other end. The force application mechanism applies force to a corresponding sliding block 16 through the rod pieces while fixing another sliding block 16, so as to apply outward stretching force to the spine model to simulate and test stretching of the spine model.

Figure 17:
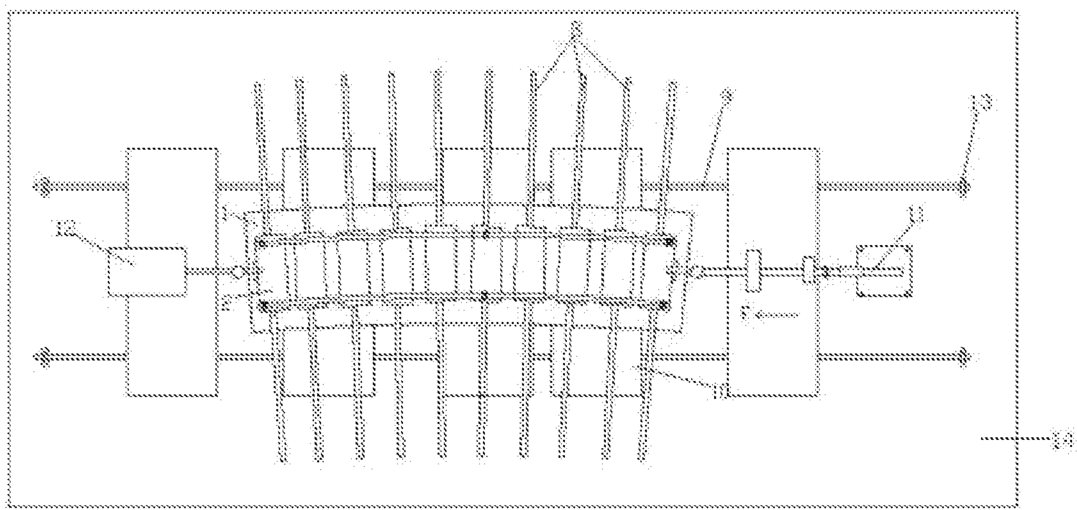
FIG. 17 is a top view of a spine model correction performance test system.
Figure 18:
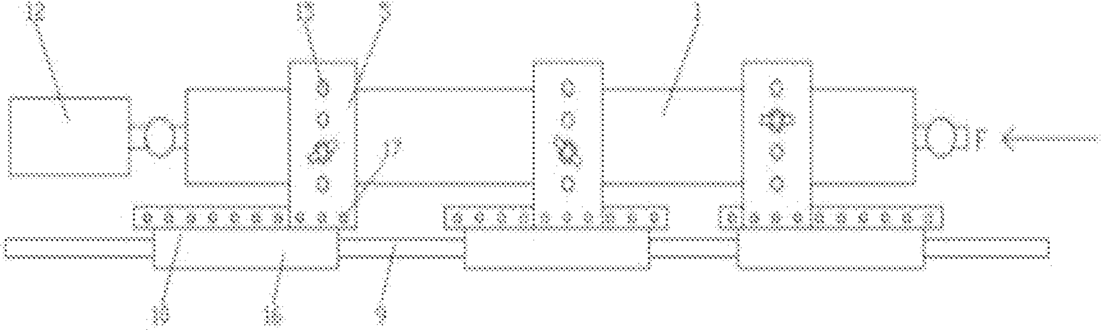
FIG. 18 is a side view of the spine model correction performance test system.

Example 10: a spine model correction performance test system includes a spine model, and further includes a compression unit connected to one end of the spine model and a dynamometer connected to the other end of the spine model. Its structure is shown in FIG. 17 and FIG. 18, the spine model on which a scoliosis correction system is installed is fixed to a plurality of sliding tables 10, the sliding tables 10 can slide on rails 9 through sliding blocks 16, and the compression unit 11 and the dynamometer 12 are respectively fixed to the two sliding tables 10 at the outermost end of the rails 9. The compression unit 11 may be a machine such as a hydraulic oil cylinder or an air cylinder. The compression unit 11 is connected to the spine model through a spherical hinge at one end to apply a push force to the spine model, and the dynamometer 12 connected to the spine model at the other end in the same way can read the magnitude of force to detect mechanical properties of the spine model and the scoliosis correction system.

What is claimed is:

1. A spine model for practicing a spine correction surgery, comprising hard structures, a soft elastic connecting material, a compression unit connected to one end of the spine model, and a dynamometer connected to an other end of the spine model, wherein the hard structures simulate a layout of spine curvatures and are connected into a whole through the soft connecting material, wherein the soft elastic connecting material between the hard structures is internally provided with expansion chambers, and expansion materials or expansion structures are arranged in the expansion chambers, and wherein the spine model provides a whole visual process of a scoliosis correction demonstration for learners to help improve a learning effect and is adapted for being used to evaluate properties of a spine internal fixation system.

2. The spine model according to claim 1, wherein the hard structures have a vertebral body shape or a spine simplified simulation shape.

3. The spine model according to claim 2, wherein the spine model is used for scoliosis correction practices or correction demonstrations or correction system performance testing.

4. A scoliosis correction demonstration model, comprising the spine model according to claim 2, wherein a scoliosis correction system is installed on the spine model, and the hard structures of the spine model are provided with rod-like structures for indicating inclination angles of vertebral bodies.

5. A scoliosis correction test system, comprising the scoliosis correction demonstration model of claim 4, which is arranged on a correction system, wherein at least one end of the spine model is fixed, and a lateral curvature model is further provided with a torque application mechanism.

6. The scoliosis correction test system according to claim 5, wherein the spine model is arranged horizontally, two ends of the spine model are fixedly connected to a fixed frame respectively, and a middle part of the spine model is connected to the torque application mechanism.

7. The scoliosis correction test system according to claim 6, wherein a magnitude of force applied by the torque application mechanism is adjustable.

8. The scoliosis correction test system according to claim 5, wherein the spine model is arranged horizontally, one end of the spine model is fixedly connected to a fixed frame, the other end of the spine model is rotationally connected to the fixed frame, and the torque application mechanism is connected to the spine model close to the rotational connecting end.

9. The scoliosis correction test system according to claim 5, wherein the spine model is arranged vertically, the bottom end of the spine model is fixed, and the top end of the spine model is connected to the torque application mechanism.

10. A spine model correction performance test model, comprising the spine model according to claim 2, and further comprising force application mechanisms connected to one end of the spine model.

11. A spine model correction performance test system, comprising the spine model according to claim 2, and further comprising a compression unit connected to one end of the spine model and a dynamometer connected to the other end of the spine model.

12. The spine model according to claim 1, wherein the hard structures are blocky structures.

13. The spine model according to claim 12, wherein a plurality of through holes are formed in the blocky structures and distributed vertically or horizontally or in a grid form.

14. The spine model according to claim 12, wherein the blocky structures are externally provided with bulges, and the bulges are ring-shaped objects, column-shaped objects, spherical objects or irregularly shaped objects.

15. The spine model according to claim 1, wherein the blocky structures each comprise an upper blocky structure and a lower blocky structure, one of the upper blocky structure and the lower blocky structure being provided with a groove, the other one of the upper blocky structure and the lower blocky structure being provided with a boss matched with the groove, a space between the boss and the groove serves as the expansion chambers, and the expansion material or expansion structure is arranged in the expansion chambers.

16. A spine model, comprising hard structures, a soft elastic connecting material, a compression unit connected to one end of the spine model, and a dynamometer connected to an other end of the spine model, wherein the hard structures simulate a layout of spine curvatures and are connected into a whole through the soft connecting material;

wherein the hard structures are blocky structures;

wherein a plurality of through holes are formed in the blocky structures and distributed vertically or horizontally or in a grid form; and wherein the spine model provides a whole visual process of a scoliosis correction demonstration for learners to help improve a learning effect and is adapted for being used to evaluate properties of a spine internal fixation system.

17. The spine model according to claim 16, wherein the spine model is used for scoliosis correction practices or correction demonstrations or correction system performance testing.

18. A spine model, comprising hard structures and a soft elastic connecting material, wherein the hard structures simulate a layout of spine curvatures and are connected into a whole through the soft connecting material;

wherein the hard structures are blocky structures; and wherein the blocky structures are externally provided with bulges, and the bulges are ring-shaped objects, column-shaped objects, spherical objects or irregularly shaped objects.

19. The spine model according to claim 18, wherein the spine model is used for scoliosis correction practices or correction demonstrations or correction system performance testing.

* * * * *